US007940334B2

(12) United States Patent
Tang et al.

(10) Patent No.: US 7,940,334 B2

(45) Date of Patent: May 10, 2011

(54) ADAPTIVE GAMMA TRANSFORM UNIT AND RELATED METHOD

(75) Inventors: Ying-Yuan Tang, Taipei County (TW); Hwa-Hsiang Chang, Taipei County (TW); Hui-Fen Chia, Changhua County (TW)

(73) Assignee: Princeton Technology Corporation, Xindian Dist., New Taipei (TW)

( * ) Notice: Subject to any disclaimer, the term of this patent is extended or adjusted under 35 U.S.C. 154(b) by 1182 days.

(21) Appl. No.: 11/609,911

(22) Filed: Dec. 13, 2006

(65) Prior Publication Data

US 2007/0262932 A1 Nov. 15, 2007

(30) Foreign Application Priority Data

May 15, 2006 (TW) ............................... 95117117 A

(51) Int. Cl.
*H04N 5/202* (2006.01)
*H04N 9/69* (2006.01)

(52) U.S. Cl. ........ 348/674; 348/254; 348/671; 345/690; 345/601; 358/519

(58) Field of Classification Search .................. 348/674, 348/671, 673, 672, 254, 255, 687, 678; 345/77, 345/601, 690; 382/274, 169; 358/519
See application file for complete search history.

(56) References Cited

U.S. PATENT DOCUMENTS

| | | | | |
|---|---|---|---|---|
| 6,697,127 | B2 * | 2/2004 | Suzuki | 348/674 |
| 6,944,336 | B2 * | 9/2005 | Chiu | 382/167 |
| 7,181,088 | B2 | 2/2007 | Lin | |

FOREIGN PATENT DOCUMENTS

| | | |
|---|---|---|
| JP | S63246082 | 10/1988 |
| JP | H10145641 | 5/1998 |
| JP | H10313418 | 11/1998 |
| JP | 200216805 | 1/2002 |
| TW | 564645 | 12/2003 |
| TW | 200537415 | 11/2005 |

* cited by examiner

*Primary Examiner* — Jefferey Harold
*Assistant Examiner* — Jean W Désir
(74) *Attorney, Agent, or Firm* — Winston Hsu; Scott Margo

(57) ABSTRACT

The invention discloses a Gamma transform unit. The Gamma transform unit has a lookup table. The lookup table stores a plurality of difference values corresponding to a plurality of predetermined input values. Each of the difference values substantially equals a difference between an ideal output value and a Gamma function output value, both of which correspond to one of the predetermined input values. After the Gamma transform unit has received an input value, it generates a required Gamma function output value corresponding to the received input value through referring to the lookup table.

9 Claims, 3 Drawing Sheets

ADAPTIVE GAMMA TRANSFORM UNIT AND RELATED METHOD

BACKGROUND OF THE INVENTION

1. Field of the Invention

The present invention relates to Gamma transform, and more particularly, to a Gamma transform method requiring lesser storage space, and a Gamma transform unit thereof.

2. Description of the Prior Art

A Gamma curve represents the characteristics of a display apparatus, such as a CRT monitor, an LCD monitor, or a Plasma monitor. Using the inputted gray level and outputted luminance of a display apparatus as the transversal axis and vertical axis respectively, a drawn curve is referred to as the Gamma curve of the display apparatus. The function corresponding to the Gamma curve is called a Gamma function of the display apparatus.

Since the Gamma function of the display apparatus is not a linear function, performing mathematical operations to obtain the Gamma function output value would be a complicated job. Therefore, in the prior art a lookup table is normally utilized to store all or part of the Gamma function output values. The complicated Gamma function operations are then omitted. For example, using x and Gamma(x) to represent the input value and output value of the Gamma function respectively, the lookup table could be used to store the Gamma function output values GAMMA(0), GAMMA(1), GAMMA(2), . . . , GAMMA(253), GAMMA(254), and GAMMA(255) corresponding to the input values 0, 1, 2 . . . , 253, 254, and 255 respectively. However, since each of the Gamma function output values has a long bit length, using the lookup table to store all of the 256 Gamma function output values will cause a lot of storage space to be occupied. The overall hardware cost will also be increased.

To economize the use of storage space and to reduce the hardware cost, other prior art methods only store part of the 256 Gamma function output values in the lookup table. The rest of the Gamma function output values that are not stored in the lookup table could be obtained through interpolation. For example, assume that the lookup table is used to store the Gamma function output values GAMMA(0), GAMMA(8), GAMMA(16), . . . , GAMMA(240), GAMMA(248), and GAMMA(255) corresponding to the input values 0, 8, 16, . . . , 240, 248, and 255 respectively. If the received input value is 8, the required output value GAMMA(8) can be obtained by looking up the lookup table directly. If, on the other hand, the received input value is 11, two reference output values GAMMA(8) and GAMMA(16) should be obtained first by looking up the lookup table. Then the required output value GAMMA(11) is obtained through interpolating the two reference output values GAMMA(8) and GAMMA(16). More specifically, GAMMA(11)=(5/8)*GAMMA(8)+(3/8)*GAMMA(16). In this manner, only 33 Gamma function output values should be stored in the lookup table. Compared to the aforementioned method that stores the total 256 Gamma function output values in the lookup table, fewer storage space is required in this scheme. However, more operations must be performed in this scheme.

Since the bit length of a Gamma function output value is not short, storing the Gamma function output values in the lookup table will inevitably consume storage space to some extent. The hardware cost cannot be effectively reduced.

SUMMARY OF THE INVENTION

One of the objectives of the present invention is to provide an adaptive Gamma transform unit that economizes the use of storage space and reduces the hardware cost, and a related method thereof.

According to the claimed invention, a Gamma transform unit comprising a lookup table is disclosed. The lookup table stores a plurality of difference values corresponding to a plurality of predetermined input values. Each of the plurality of difference values is substantially equal to the difference between an ideal output value and a Gamma function output value. Both the ideal output value and the Gamma function output value correspond to one of the plurality of predetermined input values. The Gamma transform unit generates a required Gamma function output value corresponding to a received input value by referring to the lookup table.

According to the claimed invention, a Gamma transform method is disclosed. The Gamma transform method comprises utilizing a lookup table to store a plurality of difference values corresponding to a plurality of predetermined input values, and generating a required Gamma function output value corresponding to a received input value by referring to the lookup table. Each of the plurality of difference values is substantially equal to the difference between an ideal output value and a Gamma function output value. Both the ideal output value and the Gamma function output value correspond to one of the plurality of predetermined input values.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
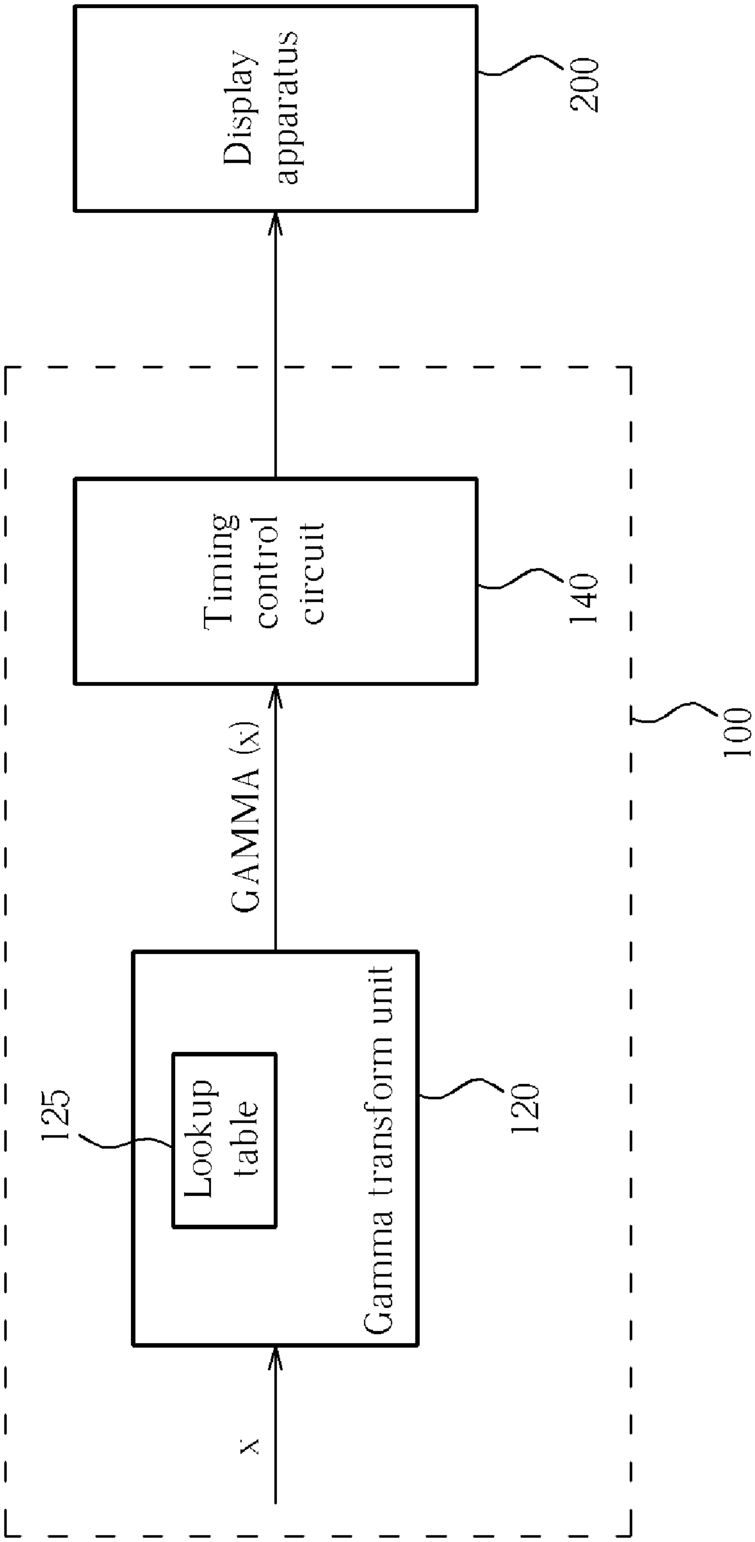
FIG. 1 shows an exemplary display driving circuit applying the ideas of the present invention.

FIG. 1 shows an exemplary display driving circuit applying the ideas of the present invention. The display driving circuit 100 shown in FIG. 1 includes a Gamma transform unit 120 and a timing control circuit 140. The Gamma transform unit 120 comprises a lookup table 125 and is responsible for simulating a Gamma function. Specifically, the Gamma transform unit 120 generates a required Gamma function output value GAMMA(x) for a received input value x through referring to the information stored in the lookup table 125. The timing control circuit 140 then drives a display apparatus 200 according to the Gamma function output value GAMMA (x) generated by the Gamma transform unit 120. For example, the timing control circuit 140 generates a horizontal-starting signal H_start, a vertical-starting signal V_start, a horizontal-output-enabling signal H_output_enable, and a vertical-output-enabling signal V_output_enable to drive the display apparatus 200.

In this embodiment, the concept of utilizing a lookup table to store Gamma function output values is abandoned. Difference values, each of which represents the difference between a Gamma function output value and an ideal output value, are stored instead. Since the bit length of each of the difference values is shorter than the bit length of each of the Gamma function output values, the space required to store a difference value is smaller than the space required to store a Gamma function output value. For example, the bit length of a Gamma function output value is 10 bits, and the bit length of a difference value is 4 bits. The concept of utilizing a lookup table to store difference values in place of Gamma function output values indeed economizes the use of storage space. In addition, the overall hardware cost is also reduced.

More specifically, each of the difference values stored in the lookup table 125 represents the difference between an ideal output value and a Gamma function output value, both of which correspond to one of a plurality of predetermined input values. In the following paragraphs, an ideal function F(x), which could be a linear function, is utilized to illustrate the relationship between the input values and the ideal output values, where x is an integer variable satisfying 0<=x<=255. In addition, a function GAMMA(x) is utilized to illustrate the relationship between the input values and the Gamma function output values. In this embodiment, the lookup table 125 stores a plurality of difference values DELTA($x_1$), DELTA ($x_2$), DELTA($x_3$), . . . , DELTA($x_{N-1}$), and DELTA($x_N$), corresponding to a plurality of predetermined input values $x_1$, $x_2$, $x_3$, . . . , $x_{N-1}$, and $x_N$, respectively. For an integer variable n satisfying 1<=n<=N, DELTA($x_n$) equals to GAMMA($x_n$)−F ($x_n$). The plurality of predetermined input values $x_1$, $x_2$, $x_3$, . . . , $x_{N-1}$, and $x_N$ constitute a subset of a integer set that includes 0, 1, 2, 3, . . . , 254, and 255. In other words, the plurality of predetermined input values $x_1$, $x_2$, $x_3$, . . . , $x_{N-1}$, and $x_N$ may encompass all or part of the possible input values, which include 0, 1, 2, 3, . . . , 254, and 255. In one example, N=254, and $x_1$=1, $x_2$=2, $x_3$=3, . . . , $x_{N-1}$=253, and $x_N$=254. In another example, N=31, and $x_1$=8, $x_2$=16, $x_3$=32, . . . , $x_{N-1}$=240, and $x_N$=248.

Figure 2:
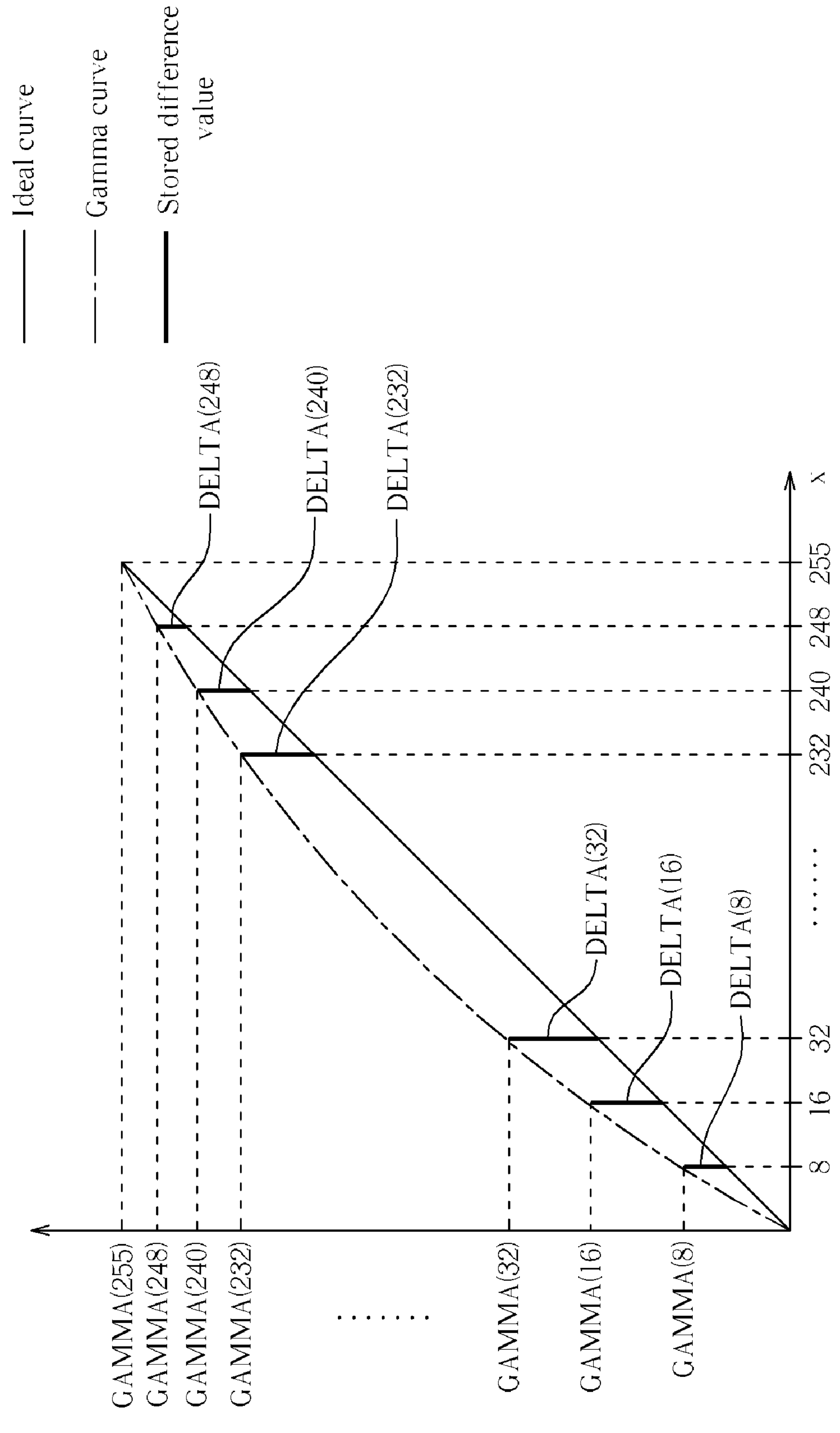
FIG. 2 and FIG. 3 are two examples illustrating how the Gamma transform unit of FIG. 1 simulates the Gamma function GAMMA(x).
Figure 3:
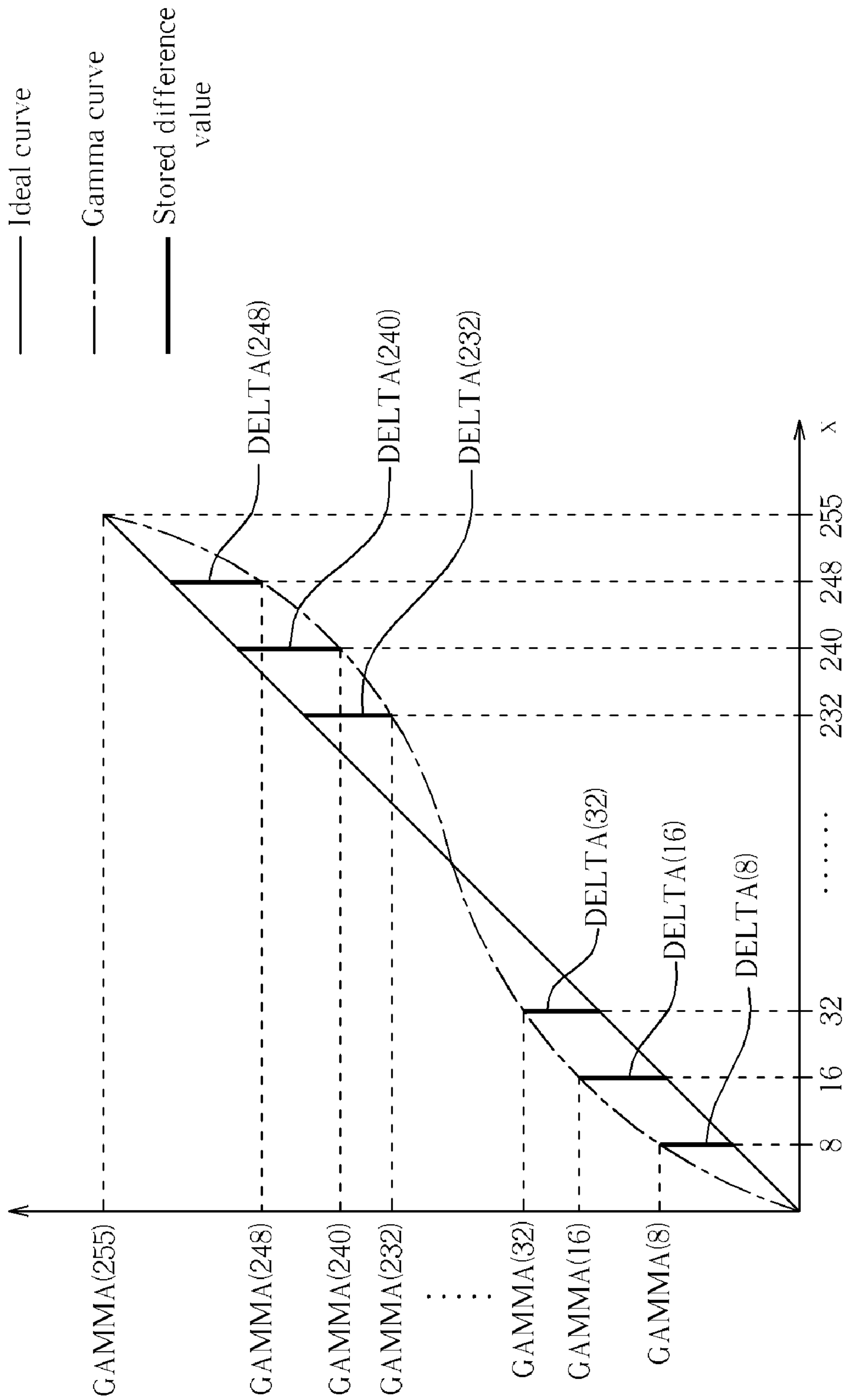

Please refer to FIG. 2 and FIG. 3, which are two examples illustrating how the Gamma transform unit 120 simulates the Gamma function GAMMA(x). The dotted lines represent the Gamma curves corresponding to the Gamma function GAMMA(x). The solid lines represent the ideal curve corresponding to the ideal function F(x). The thick line segments represent the difference values stored in the lookup table 125.

Assume that the Gamma transform unit 120 has received an input value x, for example 32, which belongs to the plurality of predetermined input values. The Gamma transform unit 120 directly looks up the lookup table 125 to obtain the difference value DELTA(32) and then combines the difference value DELTA(32) with an ideal output value F(32) to obtain the required Gamma function output value GAMMA (32).

Assume that the Gamma transform unit 120 has receive an input value x, for example 35, which does not belong to the plurality of predetermined input values. The Gamma transform unit 120 first looks up the lookup table 125 to obtain a first difference value DELTA(32) corresponding to a first predetermined input value x=32 and a second difference value DELTA(40) corresponding to a second predetermined input value x=40. Then, the Gamma transform unit 120 combines the first difference value DELTA(32) with a first ideal output value F(32) to generate a first reference Gamma function output value GAMMA(32), and combines the second difference value DELTA(40) with a second ideal output value F(40) to generate a second reference Gamma function output value GAMMA(40). Finally, the Gamma transform unit 120 interpolates the reference Gamma function output values GAMMA(32) and GAMMA(40) to obtain the required Gamma function output value GAMMA(35). More specifically, the required Gamma function output value GAMMA (35) is obtained through calculating the following equations, $$GAMMA(32)=DELTA(32)+F(32)$$

$$GAMMA(40)=DELTA(40)+F(40)$$

$$GAMMA(35)=(5/8)*GAMMA(32)+(3/8)*GAMMA(40)$$

The aforementioned input value x could be a pixel's gray level in the red domain, the green domain, or the blue domain. Since each of the color domains of the display apparatus 200 may correspond to a unique Gamma function, the aforementioned method could be used on each of the color domains to simulate the Gamma function of the very color domain.

As mentioned earlier, the bit length of each of the difference values is shorter than the bit length of each of the Gamma function output values. The storage space required to store a difference value is smaller than the storage space required to store a Gamma function output value. Therefore, compared to the method of the prior art, which stores Gamma function output values, the method of the present invention indeed retrenches the used storage space. In addition, the overall hardware cost is also reduced through applying the method proposed in the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A Gamma transform unit comprising a lookup table, the lookup table storing a plurality of difference values corresponding to a plurality of predetermined input values, each of the plurality of difference values being substantially equal to the difference between an ideal output value and a Gamma function output value, both the ideal output value and the Gamma function output value corresponding to one of the plurality of predetermined input values, wherein the Gamma transform unit generates a required Gamma function output value corresponding to a received input value by referring to the lookup table.

2. The Gamma transform unit of claim 1, wherein when the received input value matches one of the plurality of predetermined input values, the Gamma transform unit utilizes the lookup table to obtain a difference value corresponding to the received input value, and combines the obtained difference value with an ideal output value corresponding to the received input value to obtain the required Gamma function output value corresponding to the received input value.

3. The Gamma transform unit of claim 1, wherein when the received input value does not match any of the plurality of predetermined input values, the Gamma transform unit utilizes the lookup table to obtain a first and a second difference value corresponding to a first and a second predetermined input value respectively, combines the first difference value with a first ideal output value corresponding to the first predetermined input value to obtain a first reference Gamma function output value, combines the second difference value with a second ideal output value corresponding to the second predetermined input value to obtain a second reference Gamma function output value, and interpolates the first and second reference Gamma function output values to obtain the required Gamma function output value corresponding to the received input value.

4. The Gamma transform unit of claim 1, wherein the bit length of each of the plurality of difference values is shorter than the bit length of a corresponding Gamma function output value.

5. The Gamma transform unit of claim 1 being set in a display driving circuit, the display driving circuit further comprising a timing control circuit coupled to the Gamma transform unit, and the timing control circuit driving a display apparatus according to the required Gamma function output value generated by the Gamma transform unit.

6. A Gamma transform method, comprising:

utilizing a lookup table to store a plurality of difference values corresponding to a plurality of predetermined input values, each of the plurality of difference values being substantially equal to the difference between an ideal output value and a Gamma function output value, both the ideal output value and the Gamma function output value corresponding to one of the plurality of predetermined input values;

generating a required Gamma function output value corresponding to a received input value by referring to the lookup table; and driving a display apparatus by the Gamma function output value.

7. The Gamma transform method of claim 6, wherein when the received input value matches one of the plurality of predetermined input values, the step of generating a required Gamma function output value corresponding to a received input value by referring to the lookup table further comprises:

utilizing the lookup table to obtain a difference value corresponding to the received input value; and combining the obtained difference value with an ideal output value corresponding to the received input value to obtain the required Gamma function output value corresponding to the received input value.

8. The Gamma transform method of claim 6, wherein when the received input value does not match any of the plurality of predetermined input values, the step of generating a required Gamma function output value corresponding to a received input value by referring to the lookup table further comprises:

utilizing the lookup table to obtain a first and a second difference value corresponding to a first and a second predetermined input value respectively;

combining the first difference value with a first ideal output value corresponding to the first predetermined input value to obtain a first reference Gamma function output value;

combining the second difference value with a second ideal output value corresponding to the second predetermined input value to obtain a second reference Gamma function output value; and interpolating the first and second reference Gamma function output values to obtain the required Gamma function output value corresponding to the received input value.

9. The Gamma transform method of claim 6, wherein the bit length of each of the plurality of difference values is shorter than the bit length of a corresponding Gamma function output value.

* * * * *